INVENTORS
KARL WILFERT
BÉLA BARÉNYI

United States Patent Office 3,448,992
Patented June 10, 1969

3,448,992
AXLE SUSPENSION FOR MOTOR VEHICLES
Karl Wilfert, Gerlingen-Waldstadt, and Béla Barényi, Stuttgart-Vaihingen, Germany, assignors to Daimler-Benz Aktiengesellschaft, Stuttgart-Unterturkheim, Germany
Filed Sept. 20, 1966, Ser. No. 580,646
Claims priority, application Germany, Sept. 25, 1965,
D 48,289
Int. Cl. B60g 7/00
U.S. Cl. 280—112
9 Claims

ABSTRACT OF THE DISCLOSURE

An axle suspension system wherein the wheel guide members are pivoted about a transverse axis for the resilient vertical support of the wheels and connected to for movement with a bearer member that is pivotally supported about a longitudinal axis and resiliently supported in the longitudinal direction with respect to the vehicle superstructure.

Background of the invention

Axle suspension systems for motor vehicles having wheels swingably suspended at the vehicle superstructure about a central longitudinal vehicle axis as well as about a transverse vehicle axis offset with respect to the central wheel axle have presented problems with respect to rough vehicle riding, particularly longitudinal impacts occurring during the start and especially occurring by grabbing of the clutch which is favored by such longitudinal impacts.

Summary of the invention

The object of the present invention is a further improvement of this known axle suspension construction, particularly in such a manner that longitudinal impacts occurring during the start and especially the grabbing of the clutch which is favored by such longitudinal impacts are eliminated and respectively, mitigated. The present invention thus consists essentially in that the axle aggregate carrying the wheels in a cushioned manner in the direction of shock absorption is springily positioned and, respectively, supported in the longitudinal vehicle direction.

The axle aggregate is advantageously positioned in a resilient manner at the same time in the transverse direction also so that there exists, collectively, in addition to a resilience of the axle aggregate about a longitudinal and a transverse axis, also a resilience in the longitudinal and the transverse direction. As a result, the vehicle can adapt itself in a particularly perfect manner to the ground conditions of the roadway and can absorb softly in a cushioned manner impacts both in the longitudinal and also in the transverse direction. The passengers of the motor vehicle are thus afforded a particularly high degree of driving comfort.

At the same time, it has been found that, by virtue of the longitudinal resilience, the otherwise readily occurring so-called grabbing of the clutch may be prevented substantially completely.

The longitudinal elasticity of the axle aggregate may be produced in any manner desired; however, in order to avoid the occurrence of oscillations, the elements responsible for this elasticity are preferably connected to the superstructure by way of damping means. Springs operating with friction, such as cup springs or leaf-type springs, may be suitable therefor; however, rubber shock absorbers may also be employed advantageously for this purpose. Specifically, both types of damping means are especially advantageous for reasons pertaining to the inherent self-damping properties thereof and for structural reasons—in that these enclose or surround in an annular manner, for example, the stud-like or tubular ends of one bearer member of the axle aggregate and are rigidly adheringly connected at the inner and/or outer circumference thereof with metal bushings serving for securing the assembly. Instead of the friction springs or in addition thereto it is also possible to provide a separate damping device or means, for example, of the hydraulic type. By virtue of the rubber shock absorbers it is possible to achieve at the same time the desired resilience about the longitudinal axis so that separate additional bearing means are rendered superfluous.

It is a principal object of the present invention to provide an axle suspension for motor vehicles which substantially eliminates or otherwise entirely eliminates the difficulties above-mentioned inherent in prior art constructions of a similar nature.

It is another object of the present invention to provide an axle suspension for motor vehicles which substantially eliminates the occurrence of longitudinal impacts during start of the vehicle.

It is a further object of the present invention to provide an axle suspension for motor vehicles which substantially eliminates the occurrence of clutch grabbing.

It is still another object of the present invention to provide an axle suspension for motor vehicles wherein the above-mentioned difficulties are avoided by suspending the axle aggregate in such a manner as to provide resilient support thereof in the vehicle longitudinal direction.

Brief description of the drawing

These and other objects and features and advantages of the present invention will become more apparent from the following detailed description thereof when taken in conjunction with the accompanying drawings, which illustrate three embodiments of the present invention, and wherein.

Detailed description of the drawing

Figure 1:
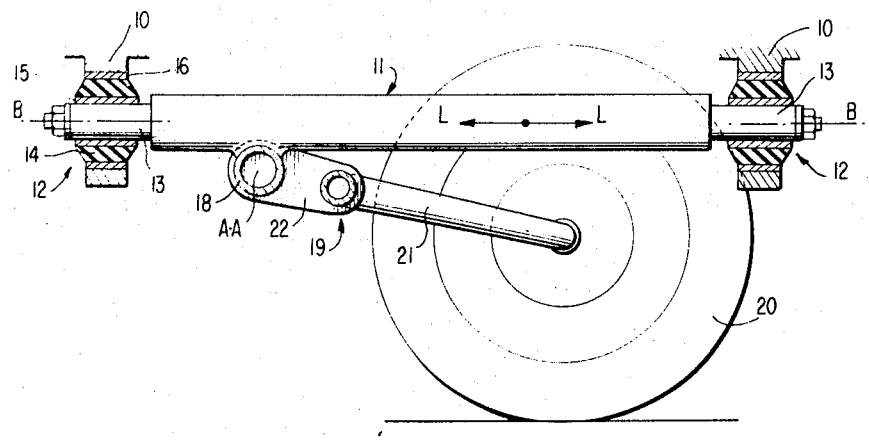
FIGURE 1 is a side view partially in section of a first embodiment of the present invention.
Figure 1:
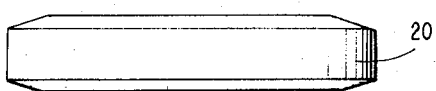
Figure 2:
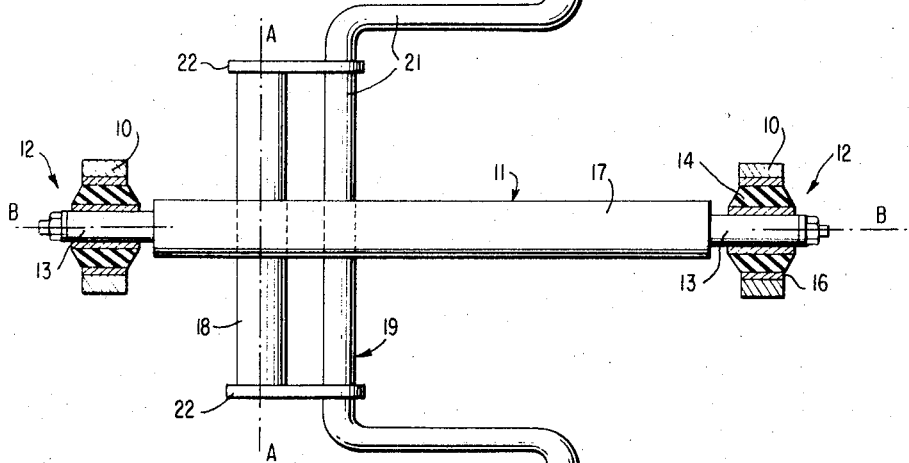
FIGURE 2 is a plan view of the embodiment of FIGURE 1.
Figure 2:
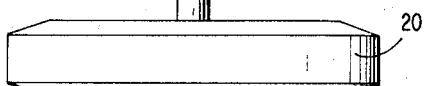

Looking now to the drawings in which like numerals have been used wherever possible throughout the views to designate like parts, in accordance with the embodiment of FIGURES 1 and 2, a longitudinally extending bearer member 11 of the axle aggregate is suspended at the vehicle superstructure 10 in rubber shock absorbers 12. These shock absorbers 12 consist of rubber rings 14 which enclose the studs 13 at the ends of the bearer member and are suitably radially inwardly widened axially to provide the proper resilience characteristics, and which are rigidly adheringly connected each with an inner metal bushing 15 to be attached to one of the studs 13 and with an outer metal bushing 16 to be attached to the vehicle superstructure. By virtue of the rubber shock absorbers 12 one obtains, on the one hand, a resilience of the axle aggregate about a central longitudinal vehicle axis B—B and, on the other hand, a resilience in the longitudinal vehicle direction L—L. The rubber material is stressed with respect to shearing in the circumferential and, respectively, in the axial direction and thereby renders possible a progressive and damped cushioning of the bearer member in these directions.

The bearer member 11 comprises a longitudinal member 17 having, for example, a tubular configuration, with both the studs 13 and a transverse member 18 secured thereto also having, for example, a tubular configuration. The vehicle axle 19 is swingably positioned at the transverse member 18 for movement about the transverse vehicle axis A—A and is provided as a rigid axle consisting, for example, of an axle tube 21 which carries the wheels 20 cranked either to the front or to the rear, and which is swingably positioned at the ends of the transverse member 18 by means of bearing arms 22 welded thereto.

The spring suspension of the wheels and, respectively, of the vhicle axle 19 with respect to the bearer member 11 may be effected in any desired conventional and well-known manner, for example by means of helical springs, leaf-type springs, rubber shock absorbers, or the like, interposed therebetween (not shown) in the same manner as the spring suspension of the bearer member is conventionally provided with respect to the vehicle superstructure, for which purpose the rubber shock absorbers 12 may possibly be utilized alone if they are dimensioned correspondingly.

The axle suspension may be employed both for driven and for non-driven rear or front wheels. It is, however, of particular advantage for driven rear wheels.

The embodiments according to FIGURES 3 and 4 differ from the embodiment which has been described hereinabove in connection with FIGURES 1 and 2, particularly by reason of the fact that in addition to the resilience about a longitudinal axis B—B, a resilience about a transverse axis A—A as well as a resilience in the longitudinal direction L—L, there is provided in these embodiments a resilience in the transverse direction, which is produced by a resilience about a longitudinal axis C—C parallel to and offset in substantially the vertical direction from the longitudinal axis B—B. Furthermore, instead of a rigid axle, such as axle 21 in FIGURES 1 and 2, the wheels 120 are positioned on crank arms 133 which are swingably independently of one another on transverse bearer member 118 for rotation about the transverse axis A—A with regard to the bearer member 111.

Figure 3:
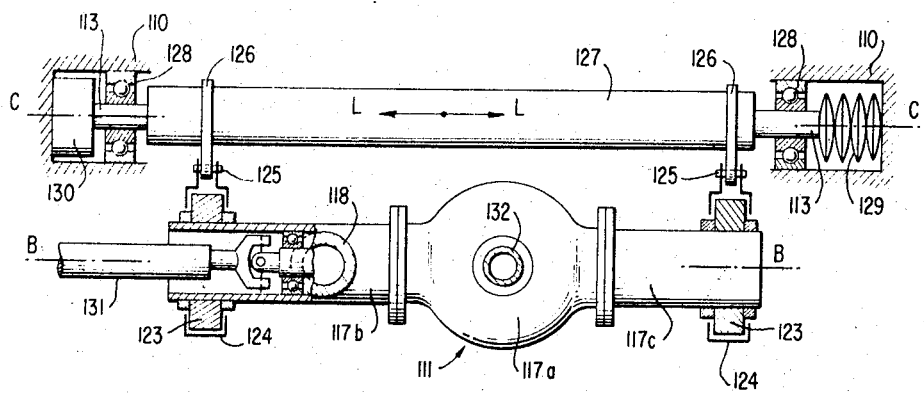
FIGURE 3 is a side view partially in section of a second embodiment of the present invention.

In the embodiment according to FIGURE 3, the bearer member 111, which consists of the axle gear housing 117a and the two tubular housing parts 117b and 117c as well as of the transverse housing part or bearer 118, is provided with bearing elements 123 rotatably positioned in bearing rings 124 which are rigidly connected, for example each by means of two screws 125 at collars or arms 126, or the like, with an additional bearer member 127. The latter is provided as a tubular or axle-like member and includes end studs 113, by means of which it is rotatably connected in rotary bearings 128 at the vehicle superstructure 110 for rotation about the longitudinal axis C—C parallel to and offset substantially vertically from axis B—B. The additional bearer member 127 is slidably accommodated with the bearings 128 in the longitudinal direction L—L of the vehicle in suitable sockets in the vehicle superstructure 110, as shown. It is axially supported in one direction (either toward the vehicle front or toward the vehicle rear) or in both directions by means of cup springs 129 extending between the stud 113 and the superstructure 110, and a damping device or means 130 assures that undesirable longitudinal oscillations between the axle aggregate and the vehicle superstructure will not be produced. The damping device or means may be of any desired type of known construction but will operate preferably with a hydraulic medium which is alternately displaced through a throttle opening in a piston to effect damping of axial movement of the additional bearer member 127.

The wheels (not illustrated in FIGURE 3) which are connected to the transverse housing portion 118 by means of crank arms are driven, for example, by an engine (not shown) being disposed forwardly within the vehicle by means of a Cardan shaft 131, by the differential gear being arranged in the axle gear housing 117a, as well as by means of universal-joint shafts 132, much in the manner illustrated in connection with the embodiment of FIGURE 4.

Figure 4:
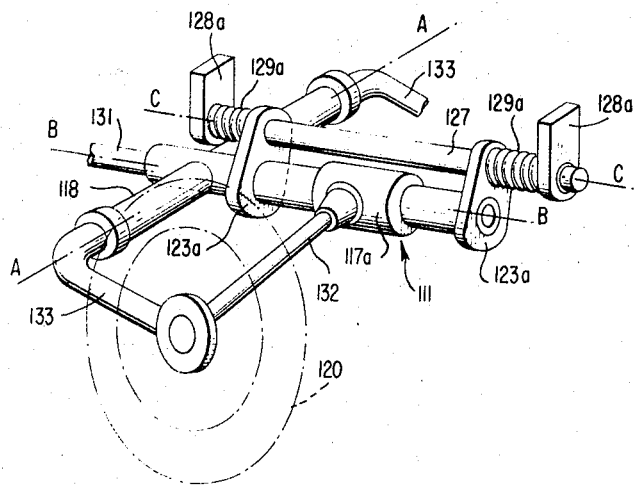
FIGURE 4 is a perspective view of a similar third embodiment of the present invention.

The embodiment according to FIGURE 4 corresponds essentially to that of FIGURE 3. Corresponding elements have therefore been identified with the same reference numerals as those of FIGURE 3. The springs 129a, however, are interposed in this case between the guide-like one-part arms 123a of the additional bearer member 127 and the bearing blocks 128a so that the additional bearer member is now secured rigidly to the vehicle superstructure. Instead of being provided as helical springs, as illustrated by way of example, they may again be provided as cup springs or, for example, as rubber shock absorbers stressed axially with regard to shearing and compression and operating preferably with a pre-stress. A separate damping device similar to device 130 in FIGURE 3 may again be provided also in this case.

FIGURE 4 additionally shows the positioning of the wheels 120 on crank arms 133 which are independently swingably accommodated on the tubular transverse bearer member or housing part 118 of the bearer member 111 about the transverse vehicle axis A—A. However, instead of being disposed on independently movable crank arms 133, the wheels 120 may also be disposed on a rigid axle wherein, for example, the crank arms 133 may be rigidly connected with one another by means of an axle member within the transverse housing part 118, which is offset with respect to the longitudinal housing part (117a, b, c).

Finally, the same considerations as have been set forth hereinabove in connection with the embodiment according to FIGURES 1 and 2 apply analogously also to the embodiments according to FIGURES 3 and 4, and features of one embodiment may analogously be exchanged for features of the other embodiment and, respectively, features of one embodiment may analogously be combined with those of the other embodiment.

We claim:
1. An axle suspension for a vehicle having a superstructure, comprising: a longitudinally extending bearer member having rubber bearing means at its front and rear ends for spring and damping action to mount said bearer member for pivotal movement about a longitudinal axis extending in the direction of travel and said rubber bearing means further mounting said bearer member for resilient movement along the axis only substantially parallel relative to the superstructure; wheel guide support means mounted for the pivotal and resilient movement with said bearer member relative to the superstructure, and mounted for pivotal movement with respect to said bearer member about a transverse substantially horizontal axis extending substantially perpendicular to said longitudinal axis; and means for mounting wheels on opposite transverse sides of said wheel guide support member with their axes of rotation being longitudinally spaced from said transverse axis.

2. The axle suspension according to claim 1, including means resiliently supporting said wheel guide support means for movement in the transverse direction.

3. The axle suspension according to claim 1, wherein said wheel guide support means includes a substantially U-shaped guide member having two legs carrying respective wheels at their outer ends.

4. The axle suspension according to claim 1, wherein said wheel guide support means provides for the independent suspension of said wheels.

5. The axle suspension according to claim 1, including an additional bearer member mounting said first-mentioned bearer member for movement in the transverse direction.

6. The axle suspension according to claim 5, wherein said first-mentioned bearer member includes a driving axle and gear box.

7. The axle suspension according to claim 5, wherein said first-mentioned bearer member and said additional bearer member are parallelly spaced from each other and extend in the vehicle longitudinal direction.

8. An axle suspension for motor vehicles having a vehicle superstructure and at least a pair of wheels, comprising: wheel support means connecting said pair of wheels to said vehicle superstructure for rotation about a vehicle longitudinal axis and for swinging movement about a vehicle transverse axis offset from the axis of said wheels, said wheel support means including resilient support means connected to said vehicle superstructure for supporting said wheels for resilient movement in the vehicle longitudinal direction, said resilient support means supporting said wheels for resilient movement in the vehicle transverse direction as well as the longitudinal direction, said wheel support means further including a longitudinally extending bearer member connected to said vehicle superstructure by said resilient support means, guide members secured to said bearer member and each carrying a respective wheel, said wheel support means further including a transverse support member secured to said bearer member, said guide members being connected to said support member for resilient movement about the axis of said support member, damping means for damping movement of said bearer member in the vehicle longitudinal direction, said damping means including resilient cushions interconnecting said bearer member with said vehicle superstructure for resilient movement primarily in the vehicle longitudinal direction, said resilient cushions enclosing in an annular manner the ends of said bearer member, and inner and outer metal bushings secured to said vehicle superstructure and adheringly connected to the inner and outer circumference of said resilient cushions.

9. The combination defined in claim 8 wherein said resilient cushions are radially inwardly widened axially and stressed with respect to shearing in the circumferential and axial directions.

References Cited

UNITED STATES PATENTS

| | | | |
|---|---|---|---|
| 2,330,541 | 9/1943 | Barenyi | 280—112 |
| 2,453,117 | 11/1948 | Buckendale | 280—124 |
| 2,732,902 | 1/1956 | Barenyi | 280—112 |
| 2,753,190 | 7/1956 | Hooven | 280—124 |
| 3,292,943 | 12/1966 | Crockett | 280—111 |

FOREIGN PATENTS

| | | |
|---|---|---|
| 1,098,376 | 8/1956 | Germany. |
| 540,702 | 3/1956 | Italy. |

BENJAMIN HERSH, *Primary Examiner.*

L. DANIEL MORRIS, Jr., *Assistant Examiner.*

U.S. Cl. X.R.

280—124